April 22, 1958
H. W. KLEIST
2,831,328
PLATES AND SYSTEMS FOR MULTIPLE REFRIGERANTS
Filed July 26, 1954
2 Sheets-Sheet 2
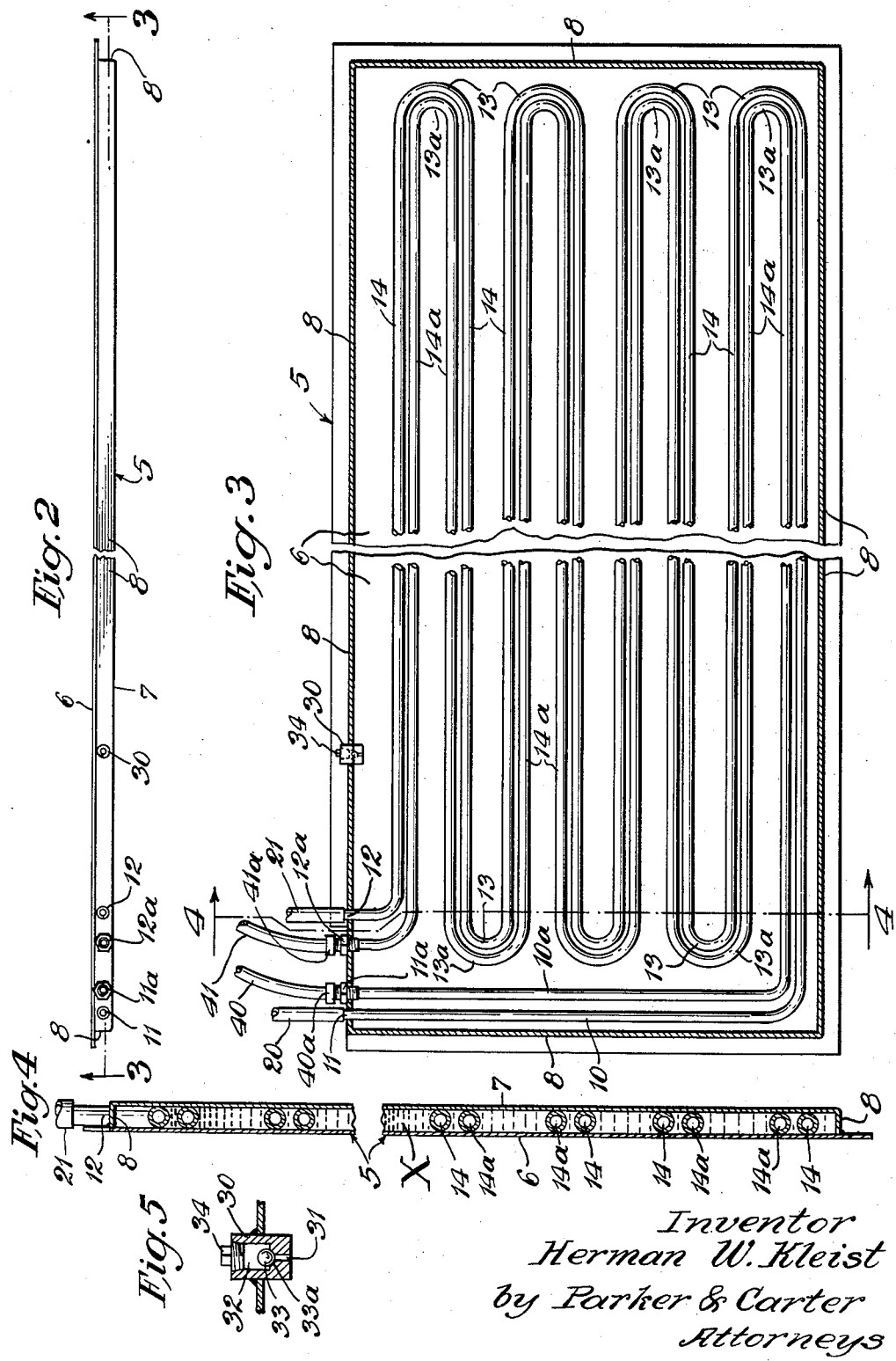
Inventor
Herman W. Kleist
by Parker & Carter
Attorneys

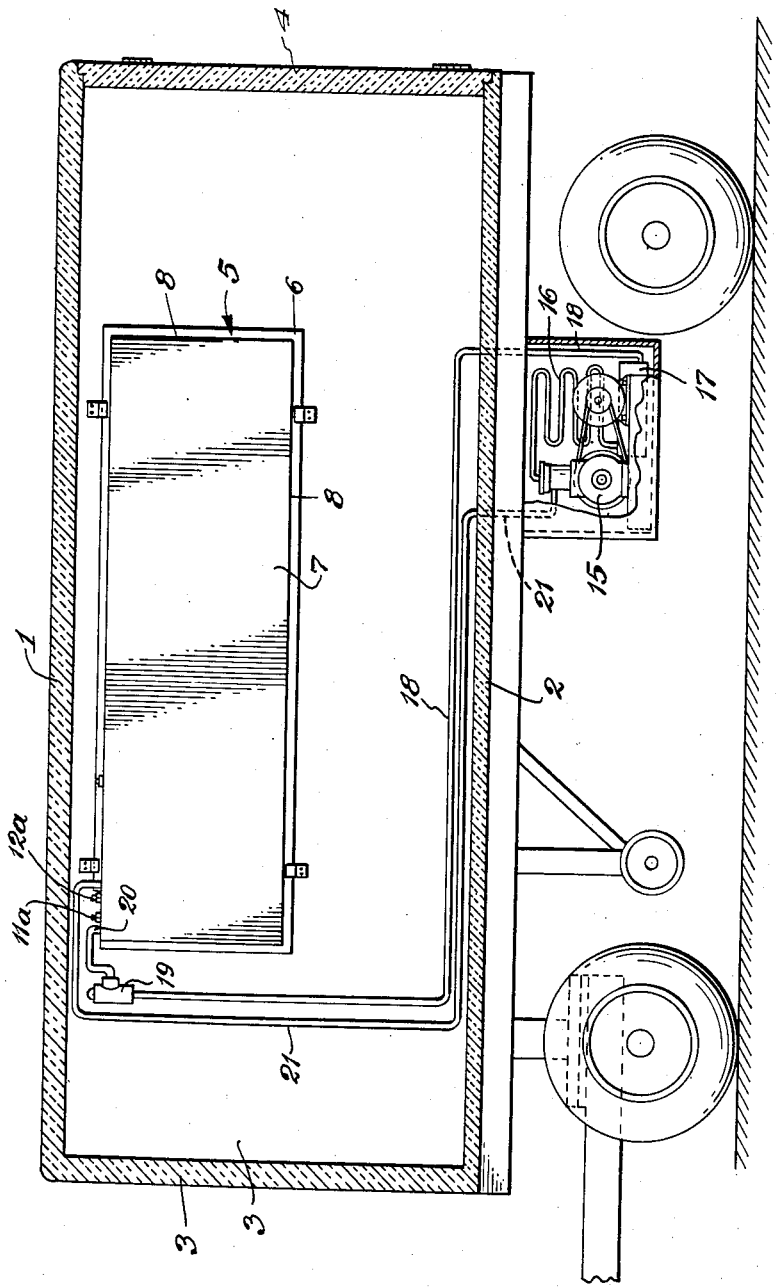

United States Patent Office 2,831,328
Patented Apr. 22, 1958

2,831,328

PLATES AND SYSTEMS FOR MULTIPLE REFRIGERANTS

Herman W. Kleist, Hollywood, Ill., assignor to Dole Refrigerating Company, Chicago, Ill., a corporation of Illinois Application July 26, 1954, Serial No. 445,846

2 Claims. (Cl. 62—126)

My invention relates to an improvement in heat exchange methods and systems, and is particularly adaptable for use in connection with evaporators where the successive or simultaneous employment of different refrigerants is important.

Another purpose is to provide an evaporator and system of its use, particularly adapted for cooling cars, trucks, or the like, as in situations where one refrigerant may be normally employed during the use of a car or truck, and another refrigerant may be employed when the truck or car is at its station or base.

Another purpose is to provide an evaporator and system in which a plurality of refrigerants may be simultaneously employed for the quick pull-down of an eutectic plate, the eutectic being subjected simultaneously to the heat abstraction effect of a plurality of refrigerants.

Another purpose is to provide an improved heat exchanger or plate in which a multiple coil system is employed.

Other purposes will appear from time to time in the course of the specification and claims.

I illustrate my invention more or less diagrammatically in the accompanying drawings wherein:

Figure 1 is a vertical, longitudinal section through a trailer to which my system has been applied;

Figure 2 is an edge view of a plate employed in my system;

Figure 3 is a section on the line 3—3 of Figure 2;

Figure 4 is a section on the line 4—4 of Figure 3; and

Figure 5 is a detail.

Like parts are indicated by like symbols throughout the specification and drawings.

Whereas my system may be employed in a wide variety of vehicles, I illustrate it as applied to a motor-drawn trailer. The trailer is shown as having an insulated top wall 1, an insulated bottom wall 2, insulated side and end walls 3, and an insulated end closure 4. It will be understood that any suitable means may be employed for defining the storage space surrounded by properly heat-insulated walls, the details of the vehicle itself being no part of the present invention.

I illustrate, within the storage space defined by the above mentioned walls, a plate, indicated as 5. I find it advantageous to employ a plate having opposite walls 6 and 7 suitably sealed together about their edges to define a gas-tight space. I illustrate, for example, edge wall portions 8 which may be bent from the plate 7 and may be welded or otherwise secured to the plate 6. Within the gas-tight space thus formed I illustrate two independent but cooperating coil systems. The first coil 10 extends from an inlet 11 to an outlet 12 by means of a plurality of bends 13 and parallel lengths 14. It may be connected, for example, to a suitable assembly including a compressor 15, a condenser 16, and a receiver 17. A supply duct 18 extends from the pressure side of the compressor 15, through the condenser 16 and the receiver 17 to any suitable reduction valve or element 19. Thence the volatile liquid refrigerant flows by the inlet duct 20 to the inlet 11 of the coil 10. The evaporated refrigerant returns through any suitable return pipe 21 to the suction side of the compressor 15.

When the vehicle is on the road, carrying a load of cooled material, I may find it advantageous to maintain the compressor 15 in continuous or in intermittent operation. I may supplement the refrigerating action of the volatile refrigerant by positioning within the plate formed by the above mentioned walls, a suitable eutectic, indicated at X in Figure 4. This eutectic preferably partially or substantially fills the space within the plate but exterior to the coil 10 and to the later described coil 10a. I may find it advantageous to maintain a less-than-atmospheric pressure within the plate. In that event, I may employ any suitable fitting, such as is shown in Figure 5, in which a body 30 has an outlet passage 31 through which air may be suitably exhausted from the interior of the plate. The passage 31 is in communication with a larger passage 32 in which a valve ball 33 is positioned. After air has been withdrawn through the passage 31, the ball is normally urged toward the closing position in which it is shown in Figure 5, by the excess of atmospheric pressure over the pressure within the plate. Any suitable seat 33a may be provided. 34 is any suitable closure for the outer end of the passage 32.

Thus, under normal circumstances, the excess atmospheric pressure maintains the plate side walls 6 and 7 firmly thrust in against the coils 10 and 10a, or against any suitable spacing means, if spacing means are employed. It will be understood that if the interior of the plate is largely filled by the eutectic X, there may be a slight swelling of the plate when the eutectic expands, upon being frozen. I preferably leave enough space within the plate, by partially filling it with eutectic, to prevent any damaging expansion. In any event, as the eutectic thaws, the excess atmospheric pressure is effective to thrust the plate side walls together toward each other, as shown in Figure 4. The coils themselves, or suitable additional spacing means, may be relied upon to limit the movement of the plate side walls toward each other.

In one use of my invention it is employed in connection with trucks and trailers, or railroad refrigerant cars, in which, upon the return of the vehicle to a suitable operating base, it is frequently found desirable to supplement or replace the operation of the compressor 15, in order to obtain a quick freezing of the eutectic. I therefore provide an additional coil 10a, having a suitable inlet connection 11a and outlet connection 12a. Its bends 13a and rectilinear lengths 14a are shown as extending along and parallel with the corresponding parts of the first mentioned coil 10. I thus provide two closely adjacent, but independent, coils, each of which is, or may be, connected to an independent refrigerant source.

Whereas the coil 10 is normally connected as above described, in relation to the compressor 15, the inlet 11a receives an outside detachable inlet duct or passage 40, and the outlet 12a is adapted to receive a removable or detachable outside outlet duct or passage 41. The passages 40 and 41 may be connected to any suitable outside refrigerant system, not herein shown. I illustrate the ducts 40 and 41 as flexible, and as provided with fittings or connections 40a and 41a. Thus, when the vehicle is at an operating station where additional refrigerant is available, it may be connected to pass such additional refrigerant through the coil 10a. It will be understood that where a quick pull-down of an eutectic plate is desired, I thus have the benefit of the simultaneous cooling operation of both coils. Under other circumstances, I may limit the cooling action to one coil or to the other coil, depending upon the desire of the operator and the location of the vehicle. I do not wish to limit my invention to the use of the two coils with an eutectic, but it is particularly well suited to the quick freezing of an eutectic at a central station, where both coils are simultaneously abstracting heat from the eutectic. On the other hand, when the vehicle is on the road or in transit, or stored at a point remote from a central service station, the compressor 15 is always available to cycle a volatile refrigerant through the coil 10, either constantly or intermittently, depending upon the need of the particular situation or the characteristics of the particular installation.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

In the transportation of frozen or chilled materials it is important to provide an adequate storage of refrigerating effect, or an adequate maintenance of refrigeration, during transit of the vehicle or during the location of the vehicle at points other than a service station. As shown in Figure 1, I provide a vehicle, the refrigerated storage space of which may be maintained at a predetermined temperature range by the continuous or intermittent cycling of a volatile refrigerant, with an evaporator, such as the plate 8 located in heat exchange relation to the refrigerated space. Preferably, I employ an evaporator or cold plate in which the coil for the refrigerant is surrounded partially or wholly by an eutectic. The eutectic acts as a storage of refrigerating effect.

In the system as herein shown the coil 10 constitutes the means for freezing the eutectic or for holding the plate temperature down during the normal use of the vehicle, since the compressor 15 and condenser 16 travel with the vehicle. Where eutectic or truck plates are used, it is important to get a quick pull-down for freezing of the eutectic. Under some circumstances, where the time factor is important, I find that it is advantageous to have more than one cooling coil in contact with the eutectic of a given plate. Thus, at a service point, the operator may elect to operate the compressor 15 and, at the same time, supplement the action of the compressor 15 by connecting the supplemental or additional coil 10a to an outside refrigerating system. The result is a singularly flexible installation in which the operator may, during the trip, rely on cycling alone or on eutectic alone, or a combination of the two. And at the service point the operator, when time is not a factor, may rely on the compressor 15 or upon an additional, separate system, to which the evaporator can be connected by the flexible ducts 40 and 41. Where a maximum of speed of pull-down is important, then the operator simultaneously abstracts heat through both coils.

It will be realized that whereas I have shown the coils in heat exchange contact with both walls 6 and 7, I may find it preferably to employ any suitable spacing means, where a thicker plate and a larger volume of eutectic is required. While I find it advantageous to rely on the above described pressure differential to keep the coils in heat exchange contact with at least one plate side wall, I do not wish to be limited specifically to vacuum plates.

I claim:

1. For use in a refrigeration system for vehicles and the like, said vehicle having means thereon for cycling a volatile refrigerant, the improvement comprising an evaporator plate adapted to be mounted in said vehicle and having outer walls sealed together to form a generally gas-tight housing, a first sinuous coil in said housing constructed to be connected in circuit with said volatile refrigerant cycling means, said first sinuous coil having a plurality of rectilinear lengths and integral connecting bends, a second sinuous coil in said housing generally coextensive with the first sinuous coil and having an independent inlet and outlet and fittings therefor adapted removably to receive flow pipes adapted for the simultaneous flow of a volatile refrigerant from a different source so that a separate refrigerant may be circulated through the second sinuous coil to speed up the pull down at a service point, said second sinuous coil having a plurality of rectilinear lengths and integral connecting bends, the bends and lengths of the second coil being generally spaced opposite and disposed approximately parallel to the corresponding lengths and bends of the first sinuous coil so that the second sinuous coil provides approximately the same heat transfer length as the first, and a body of eutectic within said plate in heat exchange relation with both coils.

2. The structure of claim 1 further characterized in that the coils are round in cross section and of like diameter, the evaporator plate having opposed side walls positioned for heat exchange with both coils, and additionally characterized by and including means for maintaining a less-than-atmospheric pressure in the interior of said plate whereby atmospheric pressure is effected to urge the side plate walls toward heat exchange relation with both coils.

References Cited in the file of this patent

UNITED STATES PATENTS

| | | |
|---|---|---|
| 2,217,702 | Kleist | Oct. 15, 1940 |
| 2,575,939 | Brouer | Nov. 20, 1951 |
| 2,607,203 | Kleist | Aug. 19, 1952 |
| 2,635,432 | Kleist | Apr. 21, 1953 |